(12) United States Patent
Alliot

(10) Patent No.: US 10,378,331 B2
(45) Date of Patent: Aug. 13, 2019

(54) MONITORING INTEGRITY OF A RISER PIPE NETWORK

(71) Applicant: OneSubsea IP UK Limited, London (GB)

(72) Inventor: Vincent Alliot, Paris la Défense (FR)

(73) Assignee: OneSubsea IP UK Limited, London (GB)

( * ) Notice: Subject to any disclaimer, the term of this patent is extended or adjusted under 35 U.S.C. 154(b) by 1102 days.

(21) Appl. No.: 14/404,404

(22) PCT Filed: May 30, 2013

(86) PCT No.: PCT/US2013/043200
§ 371 (c)(1),
(2) Date: Nov. 26, 2014

(87) PCT Pub. No.: WO2013/181303
PCT Pub. Date: Dec. 5, 2013

(65) Prior Publication Data
US 2015/0149114 A1    May 28, 2015

Related U.S. Application Data

(60) Provisional application No. 61/653,093, filed on May 30, 2012.

(51) Int. Cl.
| | | |
|---|---|---|
| *E21B 17/01* | (2006.01) |
| *G01C 9/06* | (2006.01) |
| *E21B 47/00* | (2012.01) |
| *G01M 13/00* | (2019.01) |

(52) U.S. Cl.
CPC ........ *E21B 47/0001* (2013.01); *E21B 17/012* (2013.01); *E21B 17/015* (2013.01); *G01C 9/06* (2013.01); *G01M 13/00* (2013.01)

(58) Field of Classification Search
None
See application file for complete search history.

(56) References Cited

U.S. PATENT DOCUMENTS 4,099,583 A * 7/1978 Maus ...................... E21B 7/128
                                                                  175/25
4,702,321 A * 10/1987 Horton ................ B63B 35/4413
                                                                  114/256
4,802,431 A * 2/1989 Pollack .................. B63B 22/021
                                                                  114/230.13

(Continued)

FOREIGN PATENT DOCUMENTS

JP          3840325 B2     11/2006

OTHER PUBLICATIONS

International Search Report dated Sep. 5, 2013 for PCT Application No. PCT/2013/043200 filed on May 30, 2013.

*Primary Examiner* — Gregory J Toatley, Jr.
*Assistant Examiner* — Brandon J Becker
(74) *Attorney, Agent, or Firm* — Eubanks PLLC

(57) ABSTRACT

Methods and systems are described for monitoring the integrity of a subsea pipeline network to transport the production fluid from a subsurface wellhead to surface facilities. More specifically, the described methods and systems are for monitoring the integrity of a riser pipe network and can include installing one or more inclinometers to the buoyancy tank and/or vertical riser structures.

17 Claims, 6 Drawing Sheets

(56) References Cited

U.S. PATENT DOCUMENTS

| | | | | |
|---|---|---|---|---|
| 4,820,217 A * | 4/1989 | Joubert | B63B 21/507 | 114/144 B |
| 5,058,421 A * | 10/1991 | Alexander | G01F 23/241 | 340/620 |
| 5,461,905 A * | 10/1995 | Penisson | G01M 3/36 | 73/46 |
| 5,595,456 A * | 1/1997 | Berg | B65D 90/105 | 405/53 |
| 5,767,671 A * | 6/1998 | McCoy | E21B 12/02 | 324/209 |
| 6,257,162 B1 * | 7/2001 | Watt | B63C 11/42 | 114/221 R |
| 7,685,892 B2 * | 3/2010 | Hoen | E21B 17/20 | 73/862.391 |
| 2005/0100414 A1 * | 5/2005 | Salama | E21B 17/01 | 405/224.2 |
| 2007/0000667 A1 | 1/2007 | Mackenzie et al. | | |
| 2007/0231072 A1 * | 10/2007 | Jennings | F03B 13/10 | 405/75 |
| 2007/0278007 A1 * | 12/2007 | Krueger | E21B 21/00 | 175/25 |
| 2008/0128138 A1 * | 6/2008 | Radi | E21B 19/004 | 166/350 |
| 2009/0084302 A1 * | 4/2009 | Daran | B63B 21/22 | 114/293 |
| 2010/0051279 A1 * | 3/2010 | Baugh | E21B 17/015 | 166/302 |
| 2010/0172699 A1 * | 7/2010 | Saint-Marcoux | E21B 17/012 | 405/224.2 |
| 2010/0178819 A1 * | 7/2010 | Straume | B63B 21/04 | 441/5 |
| 2011/0146797 A1 * | 6/2011 | Tan | E21B 17/015 | 137/1 |
| 2011/0290499 A1 * | 12/2011 | Petegem | B63B 25/28 | 166/350 |
| 2012/0085544 A1 * | 4/2012 | Shilling | E21B 17/015 | 166/345 |
| 2012/0179390 A1 * | 7/2012 | Kimmiau | E21B 47/0001 | 702/35 |
| 2012/0213587 A1 * | 8/2012 | Le Bas | E21B 43/0122 | 405/60 |
| 2012/0230770 A1 * | 9/2012 | Sintini | E21B 17/01 | 405/169 |
| 2012/0292039 A1 * | 11/2012 | Saint-Marcoux | E21B 17/012 | 166/345 |

* cited by examiner

MONITORING INTEGRITY OF A RISER PIPE NETWORK

CROSS REFERENCE TO RELATED APPLICATIONS

This patent application claims the benefit of U.S. Prov. Ser. No. 61/653,093 filed May 30, 2012, which is incorporated by reference herein.

FIELD

The invention relates to method and system for monitoring the integrity of a subsea pipeline network to transport the production fluid from a subsurface wellhead to surface facilities. More specifically, the invention relates to a method and system for monitoring the integrity of a riser pipe network.

BACKGROUND

Subsea oil and gas field architecture integrates a pipeline network to transport the production fluid from the wellhead to the surface facilities. As part of this pipeline network a riser pipe structure is provided close to the surface process facilities to lift the fluid from the seabed to the surface.

The riser structure may contain a buoyancy tank providing an uplift tension to one or more vertical riser pipe(s) and a flexible pipe connecting the top of the vertical riser to surface process facilities.

Accidental flooding of the buoyancy tank could create a potential hazard to the riser structure and expose the field to a risk of catastrophic failure if a sufficient uplift tension is not applied to the vertical riser pipe system. In order to mitigate this risk, operators may request to install instrumentation to monitor possible accidental flooding of the buoyancy tank. To this end, the tension generated by the buoyancy is permanently monitored by means of an integrity monitoring system sensor equipped with gages able to measure the pipe strain. Such a system is acceptable for monitoring sudden event but could be limited in case of slow water intrusion inside the tank due, for instance, to corrosion.

SUMMARY

According to some embodiments, an alternative method and system are described to monitor the integrity of a riser pipe network. According to some embodiments, the method includes measuring the inclination of the riser system to detect undesired flooding events. According to some embodiments, the tilt angle of the vertical pipe are measured and monitored in order to detect possible loss of buoyancy. The described method and system can includes means to differentiate between the riser behavior variations resulting from different sources. The described method and system can include means to calculate and/or predict the effect of the different sources. The described method and system can include means to provide information to a surface data processing system in order to monitor the integrity of a riser pipe network. According to some embodiments, the information can include an estimate amount of inclination generated by the different sources.

According to some embodiments a method is described for monitoring the integrity of a subsea riser system in order to lift a production fluid from a subsurface wellhead to a surface facility. The method includes: receiving inclinometer data representing measurements from an inclinometer positioned to measure tilt of a first riser system component; and evaluating integrity of the riser system based on the inclinometer data. According to some embodiments, the riser system comprises: a vertical riser pipe configured to lift the production fluid from subsurface wellhead; a buoyancy tank configured to provide uplift tension to the vertical riser so as to maintain the vertical riser pipe in a vertical orientation; and a flexible pipe configured to transport the production fluid from the vertical riser pipe to the surface facility.

According to some embodiments, a system is described for monitoring a subsea riser system configured to lift a production fluid from a subsurface wellhead to a surface facility. The system includes: an inclinometer permanently or semi-permanently mounted to a first riser system component, the inclinometer configured to measure tilt of a first riser system component; and a data processing system configured to evaluate integrity of the riser system based on the data from the inclinometer, and to issue an alarm signal indicating to an operator that a loss of riser system integrity may have occurred. The issuing of the alarm is based on the evaluation of integrity of the riser system. The other sensors can be, for example: a flow meter configured to measure fluid density of the production fluid; a GPS system configured to measure excursion of the surface facility; and/or a current sensor configure measure local sea current.

According to some embodiments a method is described for evaluating behavior of a subsea riser system configured to lift production fluid from a subsurface wellhead to a surface facility. The method includes: receiving inclinometer data representing measurements from an inclinometer positioned and configured to measure tilt of a first riser system component; and evaluating behavior of the riser system based on the inclinometer data. Fatigue values for components of the riser system can be estimated based on the evaluation of behavior, and these values can be used, for example, to estimate useful lifetime for components of the riser system. According to some embodiments, the behavioral knowledge can be used in designing future systems.

BRIEF DESCRIPTION OF THE FIGURES

The subject disclosure is further described in the detailed description which follows, in reference to the noted plurality of drawings by way of non-limiting examples of embodiments of the subject disclosure, in which like reference numerals represent similar parts throughout the several views of the drawings, and wherein.

DETAILED DESCRIPTION

The particulars shown herein are by way of example, and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Further, like reference numbers and designations in the various drawings indicate like elements.

Figure 1:
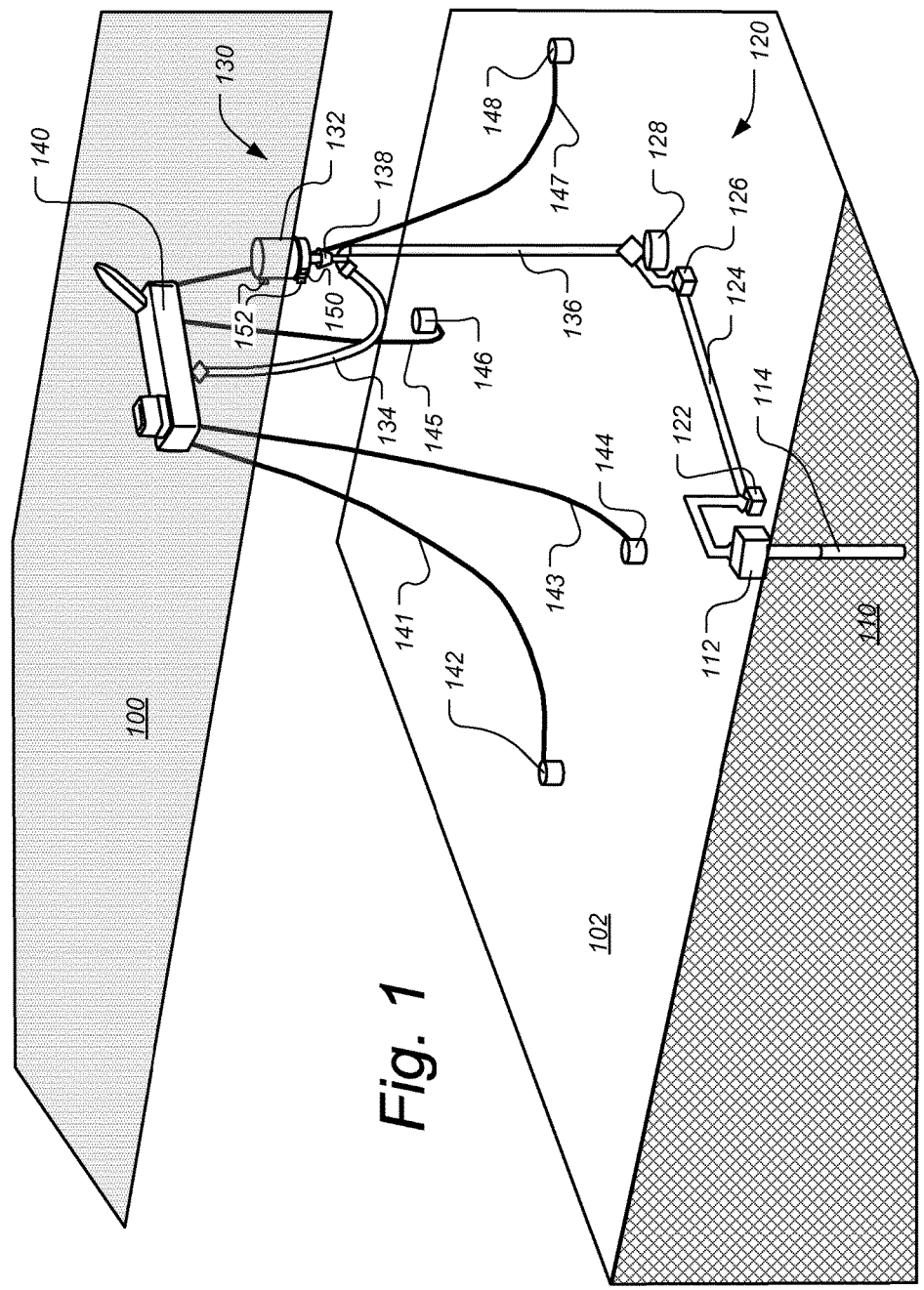
FIG. 1 illustrates a subsea oil and gas field architecture in which some embodiments are used, according to some embodiments.

FIG. 1 illustrates a subsea oil and gas field architecture in which some embodiments are used. The subsea and gas field architecture shown integrates a pipeline network 120 to transport production fluid from the wellhead 112 on the seafloor 102 to the surface facilities on the sea surface 100. Wellhead 112 draws production fluid from subterranean rock formation 110 via wellbore 114. In the example shown in FIG. 1, the production fluid flows along sea floor flowline 124 which is terminated by pipe termination 122 one end and by spool piece 126 on the other end. As part of pipeline network 120 a riser pipe structure 130 is provided close to the surface process facilities to lift the fluid from the seabed 102 to the surface 100. In some examples of this network 120, for deep and ultra-deep water, operators have adopted a hybrid free standing riser architecture which comprises: seabed riser anchor base 128; a vertical single or bundled riser pipe(s) 136 anchored to the seabed anchor base 128; a buoyancy tank 132 providing an uplift tension to vertical riser pipe(s) 136; a flexible pipe 134 connecting the top of the vertical riser 136 to the surface process facilities (FPSO) 140; and a flexible joint 138 for connecting the buoyancy tank 132 to the vertical riser 136. FPSO 140 is anchored using mooring lines 141, 143, 145 and 147 to suction anchors 142, 144, 146 and 148 respectively.

Accidental flooding of the buoyancy tank 132 could create a potential hazard to the riser system 130 and expose the field to a risk of catastrophic failure if a sufficient uplift tension is not applied to the vertical pipe system 136. In order to mitigate this risk, instrumentation can be installed to monitor possible accidental flooding of the buoyancy tank 132. Additionally, the buoyancy tank 132, in some examples, may integrate several independent compartments to limit the amount of water which could accidentally fill in the tank.

Figure 2:
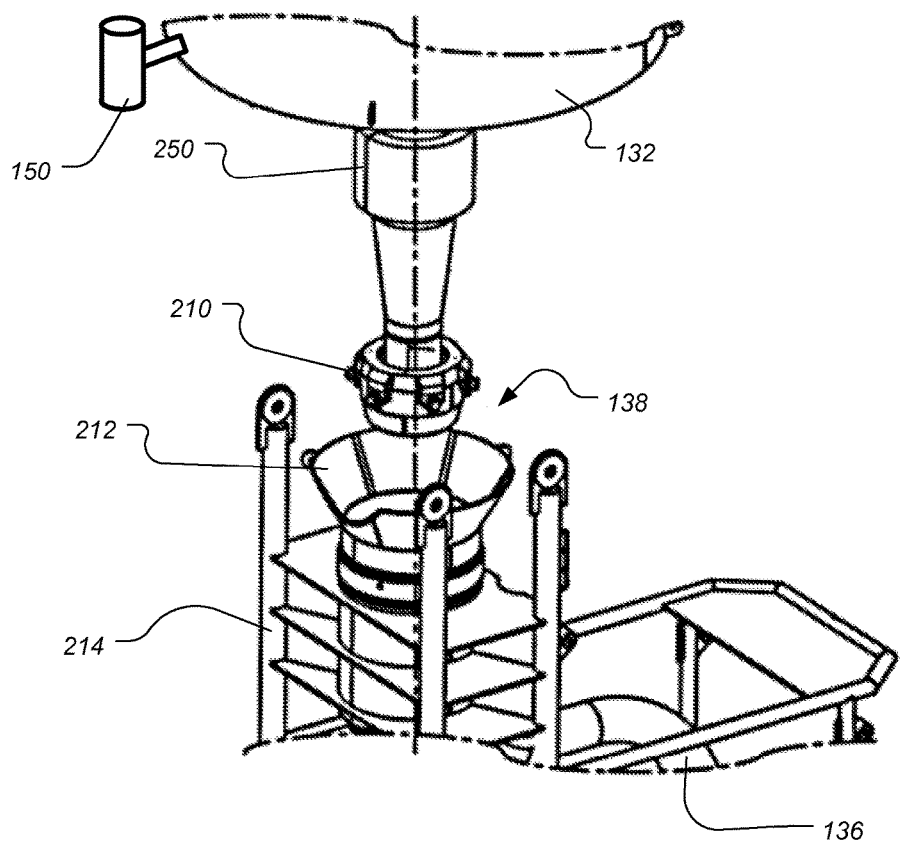
FIG. 2 shows further detail of sensors and a flexible joint between a buoyancy tank, according to some embodiments.

FIG. 2 shows further detail of sensors and a flexible joint between a buoyancy tank, according to some embodiments. Buoyancy tank 132 is flexibly linked to the vertical riser pipe 136 via a flexible joint 138. The flexible joint 139 includes a male connector 210 that mates with a flexible joint receptacle 212 that forms part of an upper riser assembly 214. In some cases, the tension generated by the buoyancy tank 132 can be permanently monitored by means of an integrity monitoring system sensor 250, which is equipped with gages configured to measure the pipe strain. Such a system 250 can be useful for monitoring a sudden event but is limited in case of slow water intrusion inside the tank 132 due for instance to corrosion. Furthermore, readings collected from the tension collar may drift and the instruments may not be recalibrated while deployed in the subsea setting. As a result, it is difficult to differentiate real water ingress from the data drift.

According to some embodiments, methods and systems are described for monitoring the integrity of riser system 130. According to some embodiments, undesired flooding events of riser buoyancy tank 132 are monitored by measuring one more behavioral parameters of the riser system 130 resulting from the loss of the buoyancy. According to some embodiments, the inclination of the riser system 130 is measured. According to some embodiments, one or more inclinometers are used of a type that is currently used the industry. Such inclinometers have been found to have high precision instrumentation, high-resolution properties, are stable, and are relatively easy to integrate with relatively low power consumption. Inclinometer 150 is shown in FIGS. 1 and 2 and is configured and positioned to measure inclination of buoyancy tank 132.

Figure 3:
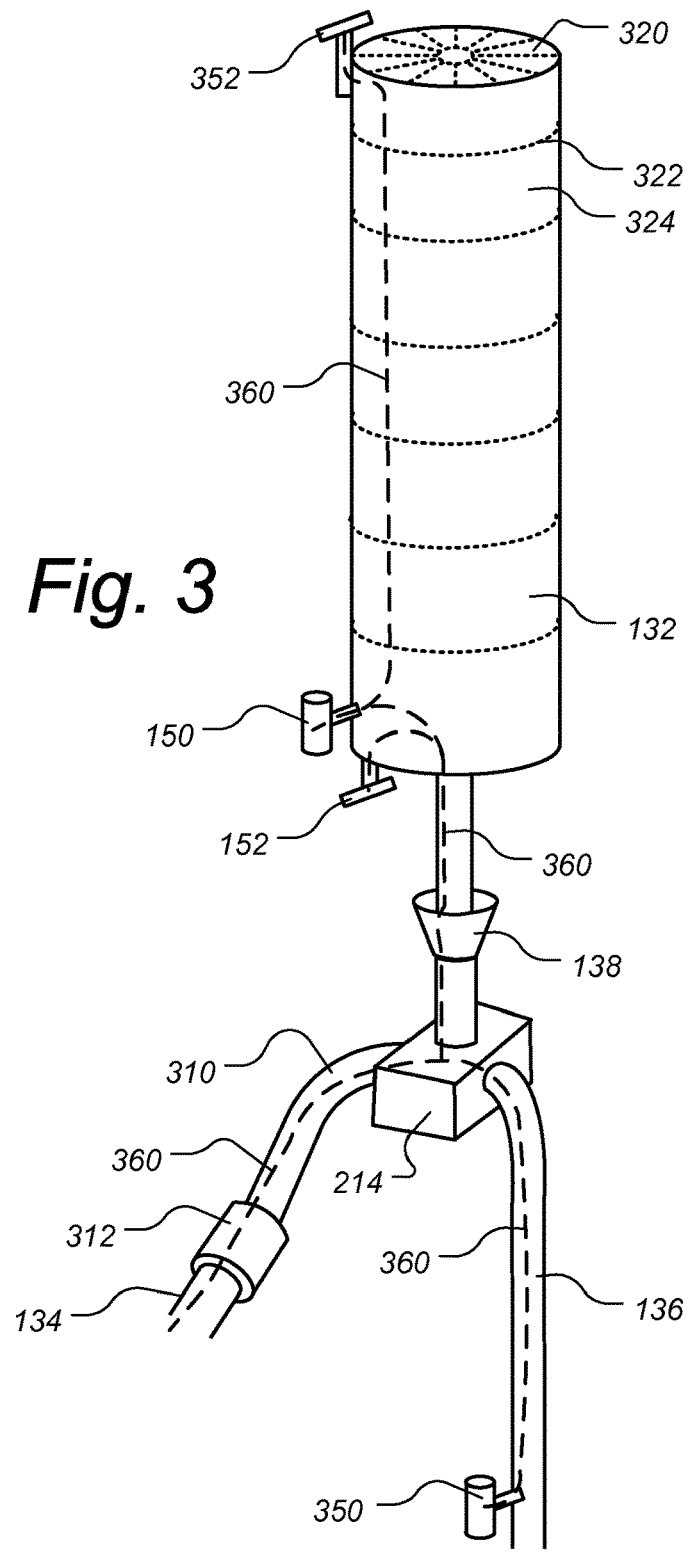
FIG. 3 shows further detail of a buoyancy tank and portions of a riser system and associated sensors, according to some embodiments.

FIG. 3 shows further detail of a buoyancy tank and portions of a riser system and associated sensors, according to some embodiments. In the case shown FIG. 3, the buoyancy tank 132 is designed as a vertical structure (such as cylinder) made of several compartments distributed around its vertical centerline in a series of sectors. An example sector 320 is shown. Also shown in FIG. 3 is upper riser assembly 214 which is used to suspend gooseneck portion 310. Portion 310 is attached to vertical riser pipe 136 as shown and also to flexible pipe section 134 via subsea connector 312.

Should one of the sector-compartments become flooded, the weight of water which has filled that sector compartment creates a bending moment. This is because the mass of water is offset in relation to the centerline of the tank 132. This bending moment affects the inclination of the tank. According to some embodiments, the inclination of the tank 132 is monitored so as to identify any undesired flooding. Inclinometer 150 is shown on tank 132, as are current meters 152 and 352 which will be described according to some embodiments, infra. Also shown in FIG. 3 is an inclinometer 350 on the vertical riser pipe 136 that according to some embodiment is installed as an alternative to inclinometer 150 as well be described infra. The sensors 150, 152, 350 and 352 can communicate and draw power using wire cable system 360 as shown. Alternatively, data can be transferred to the surface via an acoustic modem.

In some cases, rather than the buoyancy tank 132 being divided into sectors, the tank 132 is divided into a stack of compartments configured vertically. In FIG. 3 this alternative is shown by horizontal bulkheads such as bulkhead 322 which divide the tank in vertically stacked compartments such as compartment 324. In such cases, according to some embodiments, one or more inclinometers are placed on the vertical riser, such inclinometer 350 in FIG. 3. When one of the vertically stacked compartments becomes flooded, the overall behavior of the riser is impacted by reducing the upright moment generated by the buoyancy tank 132. As a result, the riser will lean towards the FPSO 140 under the pulling action of the flexible jumper 134. According to some embodiments, tilt angle of the vertical pipe 136 is monitored and measured in order to detect possible loss of buoyancy.

Figure 4:
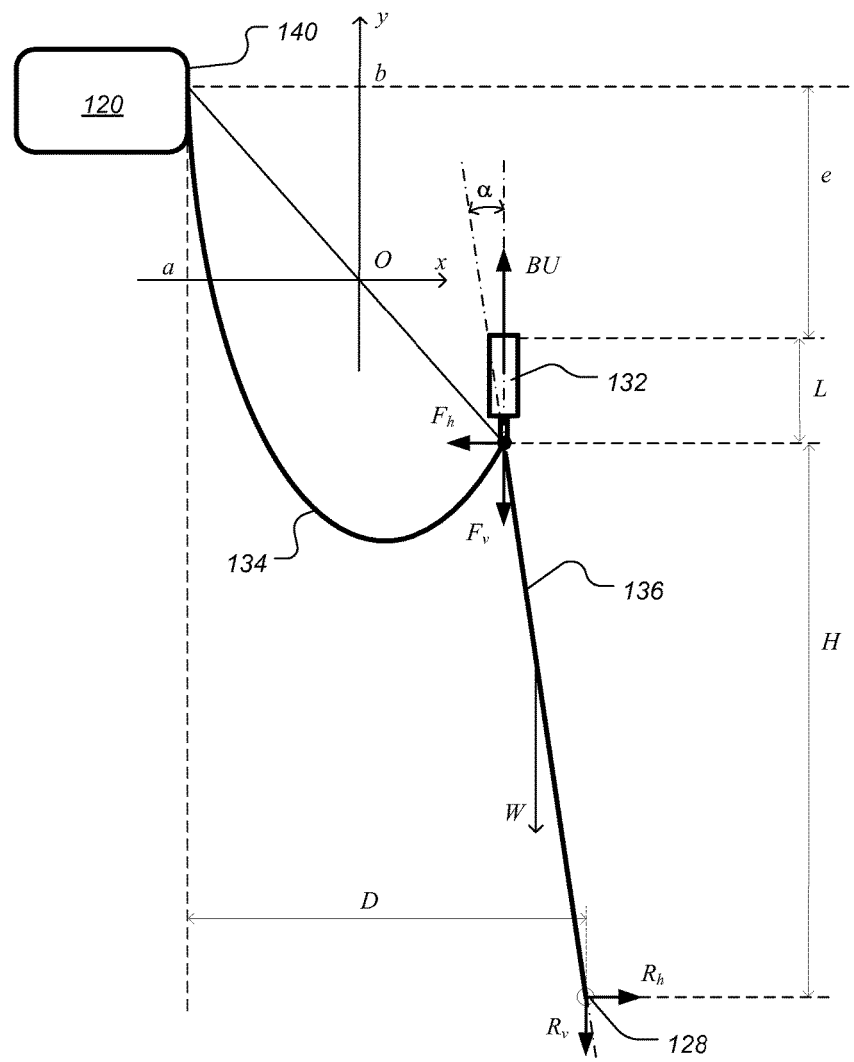
FIG. 4 is a diagram of a vertical riser under the influence of various parameters, according to some embodiments.

FIG. 4 is a diagram of a vertical riser under the influence of various parameters, according to some embodiments. As in FIG. 1, the buoyancy tank 132 provides uplift tension to vertical riser pipe 136 which is anchored to the seabed at anchor base 128. The riser pipe 136 is connected to a flexible pipe 134 that in turn is attached to FPSO 140 on the sea surface. Also shown are the following parameters:

H=the riser pipe length;
L=the buoyancy tank length;
e=the water depth of the top of the buoyancy tank;

D=the offset between the FPSO and the riser base;
BU=the net buoyance uplift;
$F_h$=the flexible horizontal pulling force;
$F_v$=the flexible vertical pulling force;
W=the submerged weight of riser pipe;
$R_v$=the anchor base vertical reaction;
$R_h$=the anchor base horizontal reaction;
α=the angular inclination of the riser; and
xOy is the local reference system for the flexible jumper catenary;
(a,b) are the coordinates of the flexible jumper attachment to the FPSO in the local reference system.

Assuming that there are no environmental loads present, the global behavior of the riser at equilibrium can be described by the following equations:

$$BU = F_v + W + R_v$$

$$F_h = R_h$$

$$BU*(H)*\tan(\alpha) = W*\frac{H}{2}*\tan(\alpha) + F_v*H*\tan(\alpha) + F_h*H.$$

It has been found that the inclination of the riser pipe network may also be influenced by other parameters including but not limited to: FPSO excursion; subsea current; fluid density flowing inside the riser piping; and seawater temperature. Therefore, according to some embodiments, systems and methods are provided for differentiating between the riser pipe network behavior variations resulting from different sources.

Figure 5:
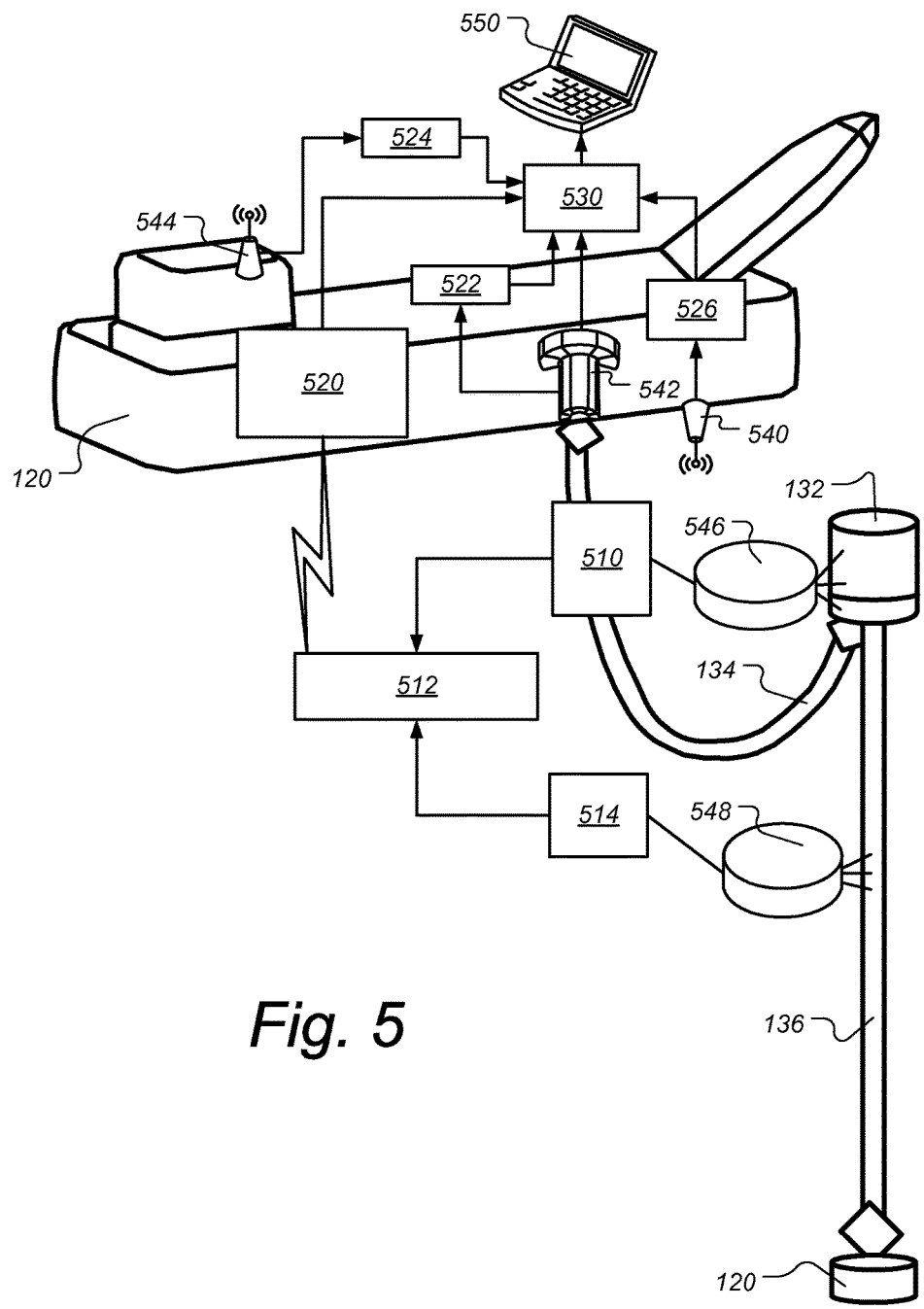
FIG. 5 illustrates aspects of an integrated system for estimating the amount of inclination generated by the various sources other than the buoyancy tank, according to some embodiments.

FIG. 5 illustrates aspects of an integrated system for estimating the amount of inclination generated by the various sources other than the buoyancy tank, according to some embodiments. According to such embodiments, additional instrumentation is provided to calculate and/or predict the effect of those sources. Some examples of such instrumentation are shown in FIG. 5. Note that according to some embodiments measurements from two or more of the types of instruments can be combined according to the application setting and instrumentation availability. An acoustic subsea current meter profiler 540 can be provided on the FPSO 140. A flowmeter 542 can be mounted on the production piping to establish fluid density. In the case shown in FIG. 5, the flowmeter 542 is housed within the FPSO 140. A differential global positioning system (DGPS) 544 can be provided on the FPSO 140 to evaluate the FPSO excursion. Inclinometers and temperature sensors 546 can mounted on the buoyancy tank 132. Inclinometers and temperature sensors 548 can also be mounted on riser 136. In either case the inclinometers and temperature sensors can be used to produce local subsea current value and seawater temperature. According to some embodiments, one or more of these measurement device work as an integrated system to provide information to a surface data processing system 550 in order to estimate the amount of inclination generated by the various sources other than the buoyancy tank 132. For example measurements 510 from the tank mounted sensors 546, which can include buoyancy tank tilt and roll and local current velocity, can be communicated to a subsea power distribution/instrument control and data transmission unit 512. Similarly, measurements 514 from riser mounted sensors 548 can be communicated to unit 512. The data from unit 512 can be transmitted via wired connection or acoustic transmission to the surface power distribution/instrument control and data transmission unit 520 on the FPSO 140. On the FPSO, fluid density measurements 522 can be fed to junction box 530. Similarly, FPSO excursion data 524 from DGPS 544 and subsea current velocity data 526 from acoustic Doppler current profiler 540 can be fed to junction box 530. Junction box 530 transmits the collected data to processing system 550 for analysis. According to some embodiments, the inclination can be measured and also predicted by a numerical model. The comparison of the measured tilt with the predicted value can be used to indicate whether loss of the integrity of the riser pipe network is occurring, for example of water is invading the buoyancy tank.

Figure 6:
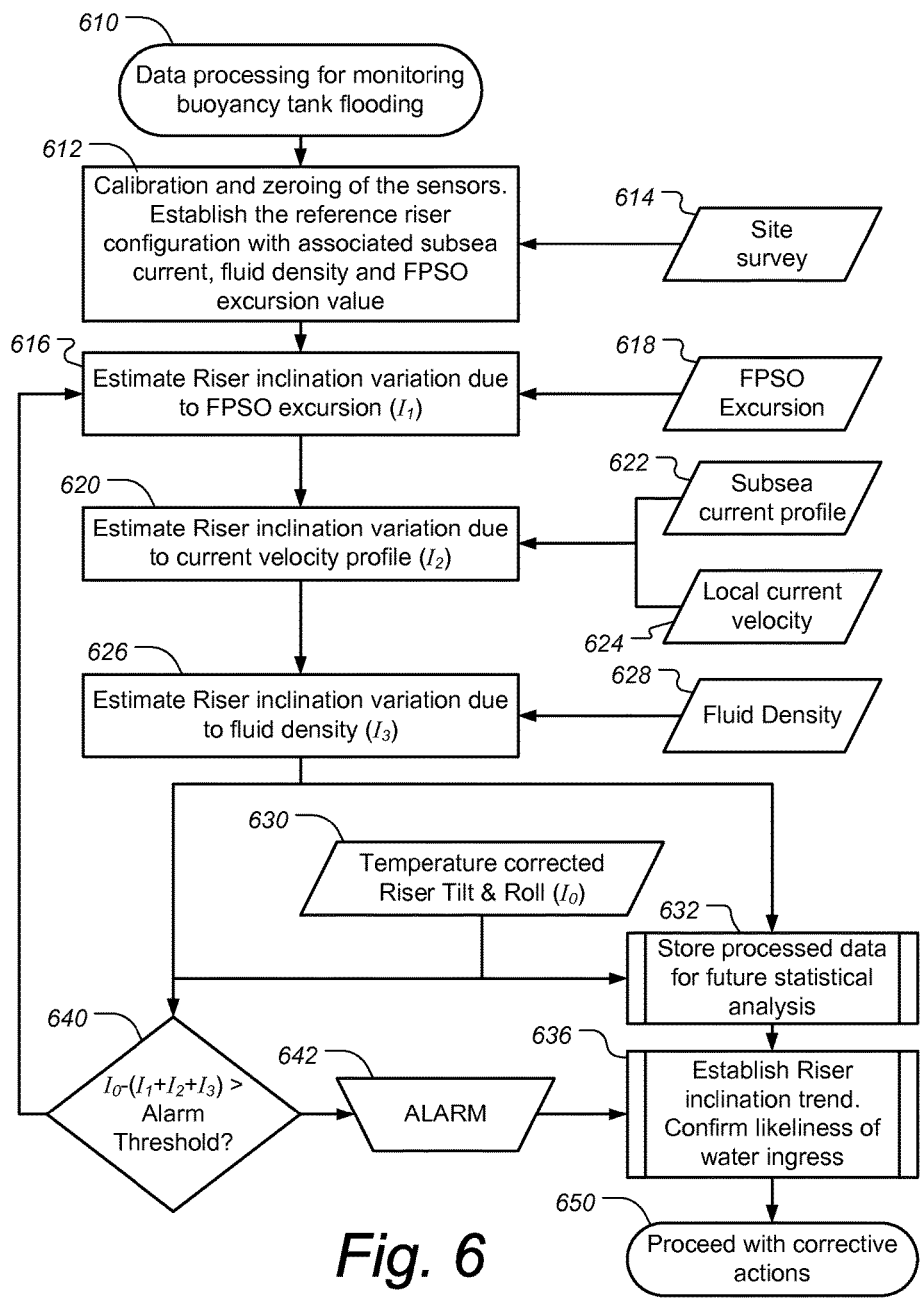
FIG. 6 is a flow chart showing aspects of data processing in order to trigger an alarm in case of loss of integrity of the riser pipe structure, according to some embodiments.

FIG. 6 is a flow chart showing aspects of data processing in order to trigger an alarm in case of loss of integrity of the riser pipe structure, according to some embodiments. According to some embodiments, the processing system 550 of FIG. 5 is used to perform the data processing shown in FIG. 6. In block 610 the data processing for monitoring buoyancy tank flood is initiated. In block 612 one or more of the various sensors are calibrated and zeroed. Using information form a site survey 614, a reference riser configuration is established with associated subsea current, fluid density and FPSO excursion value. In block 616, riser inclination various due to FPSO excursion is estimated based on input from FPSO excursion data 618 (which corresponds to data 524 in FIG. 5). In block 620, riser inclination variation due to a current velocity profile is estimated based on subsea current profile 622 and local current velocity 624. In block 626, riser inclination variation due to fluid density is estimated based on fluid density data 628 (which corresponds to data 522 in FIG. 5). In decision 640, the temperature corrected riser tilt and roll data 630 is compared to the combination of the estimated riser inclinations from blocks 616, 620 and 626. If the difference exceeds a predetermined alarm threshold then alarm 642 is triggered. In block 632 the processed data is stored for future statistical analysis. In block 636, riser inclination trends are established which can be used to confirm the likeliness of water ingress. In block 650 corrective actions can be taken.

According to some embodiments, the system to monitor the integrity of the riser pipe network as described herewith can either work as a standalone system or in combination with another monitoring system such a tension meter measuring the uplift force generated by the buoyancy tank to the riser.

Although many of the embodiments described herein have been in the specific context of particular type of a vertical riser system, according to some embodiments, the monitoring techniques described herein can be applied to any dynamic subsea structure that relies on a mechanical load generated by buoyancy to operate under well-defined environmental conditions.

According to some embodiments the systems described herein can be used by the operator to better understand and anticipate the dynamic behavior of the subsea structures/assets. This accumulated knowledge capitalization developed from the data collected by the monitoring system in place will allow optimization of both the operation and the design of the field. Using the data collected by the various sensors including inclinometers (measuring both tilt and roll); current meters, excursion monitoring, and/or fluid density, an overall behavior of various structural components can be observed over extended period. For example, data of various currents and resulting the tilt and roll of the buoyancy tank can be used to develop knowledge of the behavior of the tank. Knowledge of the behavior of the various structural components (e.g. the buoyancy tank, vertical riser, flexible joint, flexible jumper, etc.) under various load and environmental conditions can be used, according to some embodiments, for purposes such as assessing the operational lifetime of one or more of the structural components based on structural fatigue and/or other causes. The knowledge can also be used in the design phase of subsea pipeline network systems, such as in designing and specifying the components according to an optimized deployment lifetime under expected conditions.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for monitoring the integrity of a subsea riser system configured to lift a production fluid from a subsurface wellhead to a surface facility, the method comprising:
   receiving inclinometer data representing measurements from an inclinometer positioned and configured to measure tilt of at least one of a buoyancy tank of the subsea riser system and a vertical riser pipe of the subsea riser system;
   evaluating an amount of water within the buoyancy tank based at least in part on the inclinometer data; and
   issuing an alarm signal indicating to an operator that a loss of riser system integrity may have occurred, wherein the issuing of the alarm is based at least in part on the evaluation of the amount of water within the buoyancy tank.

2. A method according to claim 1 wherein the riser system further comprises:
   a vertical riser pipe configured to lift the production fluid from subsurface wellhead, wherein the buoyancy tank configured to provide an upward buoyancy force thereby exerting an uplift tension to the vertical riser pipe so as to maintain the vertical riser pipe in a vertical orientation;
   and
   a flexible pipe configured to transport the production fluid from the vertical riser pipe to the surface facility.

3. A method according to claim 1 wherein the inclinometer is permanently or semi-permanently mounted to said buoyancy tank.

4. A method according to claim 1 wherein the inclinometer is permanently or semi-permanently mounted to said vertical riser pipe.

5. A method according to claim 1 further comprising:
   receiving at least one measurement of at least one second parameter that has an influence on the tilt of at least one of the buoyancy tank and the vertical riser pipe other than change of the upward buoyancy force from the buoyancy tank;
   estimating an effect on the tilt of at least one of the buoyancy tank and the vertical riser pipe from the at least one second parameter based at least in part on the at least one measurement data; and
   comparing said inclinometer data with said estimated effect on the tilt of at least one of the buoyancy tank and the vertical riser pipe from the at least one second parameter, wherein said evaluation of the amount of water within the buoyancy tank is based at least in part on the comparison.

6. A method according to claim 5 wherein the at least one second parameter includes production fluid density and said at least one measurement includes measurements from a flow meter measuring the production fluid.

7. A method according to claim 5 wherein the at least one second parameter includes excursion of said surface facility and said at least one measurement includes measurements from a GPS system configured to measure excursion of said surface facility.

8. A method according to claim 5 wherein the at least one second parameter includes sea current activity.

9. A method according to claim 8 wherein said at least one measurement includes local current velocity measured by one or more current sensors mounted on the riser system.

10. A method according to claim 8 wherein said at least one measurement includes a subsea current profile.

11. A method according claim 1 wherein the inclinometer data is transmitted to the surface facility using wired transmission.

12. A method according to claim 1 wherein the inclinometer data is transmitted to the surface facility using an acoustic modem and the inclinometer and acoustic modem are powered by one or more batteries.

13. A system for monitoring a subsea riser system configured to lift a production fluid from a subsurface wellhead to a surface facility, the system comprising:
    a vertical riser pipe configured to lift the production fluid from the subsurface wellhead;
    a buoyancy tank configured to provide an upward buoyancy force thereby exerting an uplift tension to the vertical riser so as to maintain the vertical riser pipe in a vertical orientation;
    a flexible pipe configured to transport the production fluid from the vertical riser pipe to the surface facility;
    an inclinometer configured to measure tilt of at least one of the buoyancy tank or the vertical riser pipe; and
    a data processing system configured to evaluate an amount of water within the buoyancy tank based at least in part on the data from said inclinometer, and to issue an alarm signal indicating to an operator that a loss of riser system integrity may have occurred, wherein the issuing of the alarm is based at least in part on the evaluation of the amount of water within the buoyancy tank.

14. A system according to claim 13 wherein the inclinometer is permanently or semi-permanently mounted to said buoyancy tank.

15. A system according to claim 13 wherein the inclinometer is permanently or semi-permanently mounted to said vertical riser pipe.

16. A system according to claim 13 further comprising at least one second sensor positioned and configured to measure at least one second parameter that has an influence on the tilt of at least one of the buoyancy tank and the vertical riser pipe other than change of the upward buoyancy force from the buoyancy tank, wherein the processing system is further configured to estimate an effect on the tilt of at least one of the buoyancy tank and the vertical riser pipe from the at least one second parameter based at least in part on the data from the at least one second sensor, and to compare data from said inclinometer with said estimated effect on the tilt of at least one of the buoyancy tank and the vertical riser pipe from the at least one second parameter, wherein said evaluation of the amount of water within the buoyancy tank is based at least in part on the comparison.

17. A system according to claim 16 wherein the at least one second sensor is selected from a group consisting of: a flow meter configured to measure fluid density of the production fluid; a GPS system configured to measure excursion of said surface facility; and a current sensor configure measure local sea current.

* * * * *